US007472494B2

(12) United States Patent
Moretto (10) Patent No.: US 7,472,494 B2
(45) Date of Patent: Jan. 6, 2009

(54) ADSORPTION DEHUMIDIFIER FOR GRANULES OF PLASTICS MATERIALS

(75) Inventor: Renato Moretto, Padua (IT)

(73) Assignee: Moretto S.p.A., Padova (IT)

( * ) Notice: Subject to any disclaimer, the term of this patent is extended or adjusted under 35 U.S.C. 154(b) by 292 days.

(21) Appl. No.: 11/251,879

(22) Filed: Oct. 18, 2005

(65) Prior Publication Data

US 2006/0117594 A1   Jun. 8, 2006

(30) Foreign Application Priority Data

Oct. 19, 2004   (IT)   ............................ VR2004A0162

(51) Int. Cl.
  *F26B 21/06*   (2006.01)
  *F26B 5/00*   (2006.01)
(52) U.S. Cl. .............................. 34/416; 34/80; 34/557; 34/467
(58) Field of Classification Search .............. 34/80, 34/402, 405, 557, 416, 467, 472–477; 422/82.13
  See application file for complete search history.

(56) References Cited

U.S. PATENT DOCUMENTS 5,578,115 A * 11/1996 Cole ............................ 96/121
5,896,675 A * 4/1999 Holler et al. .................. 34/548
5,983,516 A * 11/1999 Trapp et al. .................... 34/80
6,152,163 A * 11/2000 Tsargorodski et al. ...... 137/240
6,269,553 B1 * 8/2001 Wilhelm ....................... 34/579

FOREIGN PATENT DOCUMENTS

JP   03295434 A * 12/1991

* cited by examiner

*Primary Examiner*—Kenneth B Rinehart
(74) *Attorney, Agent, or Firm*—Orum & Roth LLC (57) ABSTRACT

A dehumidification plant for granular material provided with a compressed air source, control means for controlling the flow rate of the compressed air fed by the source, a heating chamber of compressed air which is in communication with the flow rate control means, a container of granular material to be dehumidified, diffuser means disposed inside the container, temperature sensor means arranged to detect the temperature of air leaving the container, and a programmable control unit. The dehumidification plant utilizes a compressed-air dehumidifying group located downstream of flow rate control means, and a flow rate adjusting group for controlling the dehumidified air coming from the dehumidifying group located upstream of the heating chamber.

16 Claims, 6 Drawing Sheets

ND DEHUMIDIFIER FOR
ADSORPTION DEHUMIDIFIER FOR GRANULES OF PLASTICS MATERIALS

FIELD OF INVENTION

The present invention relates to an adsorption dehumidifier for granules of plastics materials.

In the field of the transformation of granules of plastics materials, a very important treatment is the dehumidification process of the granules before their transformation or polymerization, e. g. before being moulded into shaped objects. At such a dehumidification stage, water content in the granules, especially when dealing with granules of so-called "hygroscopic" plastics materials, i. e. granules that adsorb humidity therein, is to be removed.

BACKGROUND OF INVENTION

Removal of humidity from granules of plastics materials must be carried out because during transformation or polymerisation the granules are brought to fusion at relatively high temperatures and any water content in them becomes a component in the polymer molecular chain which results in breaking the polymeric chains, and in bubbles, blowholes and superficial defects being generated in the polymerized material, thus affecting the mechanical features thereof.

Many dehumidification processes for granules of plastics materials have been proposed so far. A mostly adopted dehumidification process provides the use of dry air, i. e. dried air is caused to flow through a stock of granules in order to remove any humidity (water) therefrom.

A dehumidification apparatus for granules of plastics material typically comprises a hopper arranged to contain granules of plastics material to be dehumidified, and a drying machine usually referred to as "dryer" designed to supply hot and dried air. In the case of small production plants, and thus where low air flow-rates are involved, hot compressed air is used as drying fluid.

Humidity-saturated air at a given temperature and pressure has a greater humidity content than saturated air at a lower pressure. When compressed air is expanded its humidity content is diluted in its expanded volume, and thus its relative humidity drastically drops to dew point values ranging from –15° C. to –25° C. The real value of humidity depends upon compression pressure and features of the condensation separation devices provided in a compressed air production plant. The condensation otherwise would flow in the ducts.

When a compressor is in operation, it sucks air from the environment in order to bring it to a predetermined pressure while heating it by compression. When air becomes cooled at ambient temperature, it releases the humidity exceeding that compatible with the temperature it has reached, whereby giving rise to condensation. In order to prevent condensation from reaching the air feeding line filters and traps must be provided in the feeding line. In some cases, use is made further humidity damping systems including cooling batteries or adsorption dehumidifiers.

Conventional small dehumidifiers have been developed for plastics materials in which use is made of compressed air as a means for heating and removing water content therefrom. Use of compressed air is not convenient beyond given machine dimensions as compressed air is highly expensive in terms consumed energy, and thus beyond certain rather strict limits other technical solutions such as those based on conventional dehumidifiers provided with a blower on board becomes more convenient. In practice, compressed-air dehumidifiers with a capacity higher than 30 liters are no longer competitive with respect to a conventional system.

Figure 1:
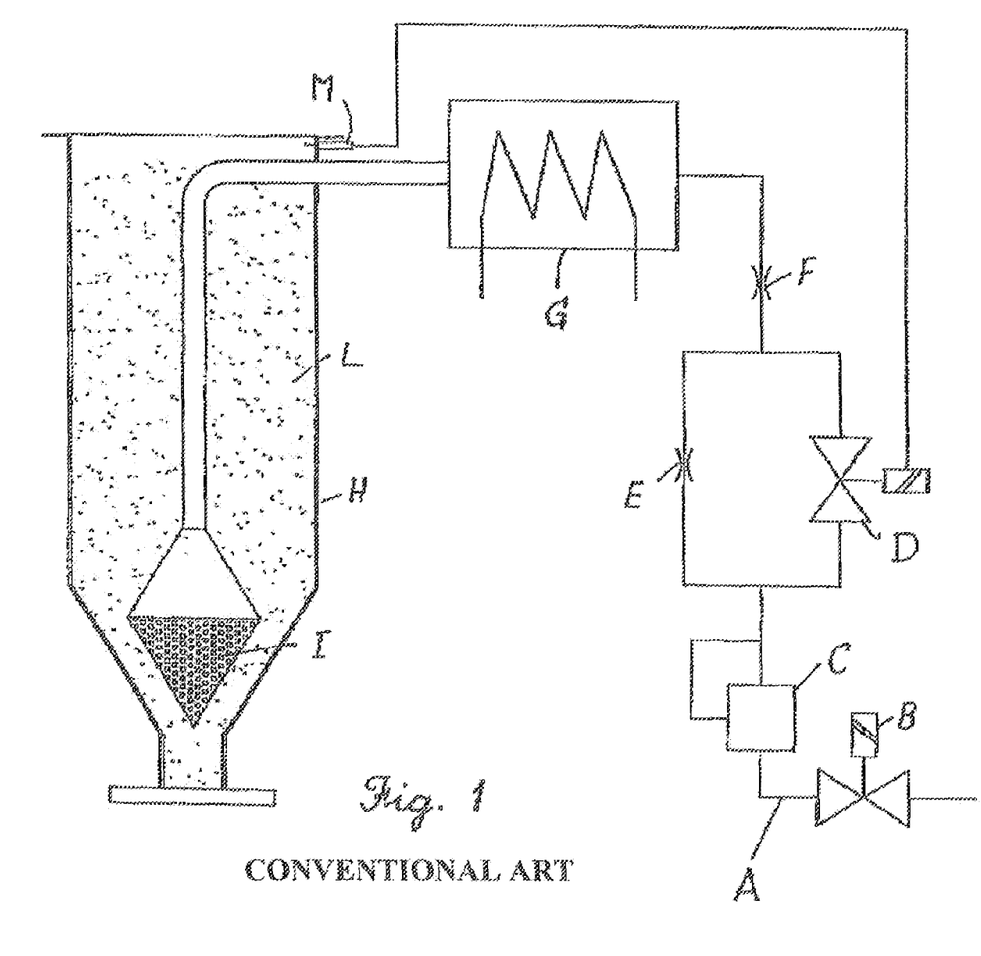
FIG. 1 is a conventional compressed-air dehumidifier.

FIG. 1 shows a conventional compressed-air dehumidifier. Compressed air at a pressure ranging from 6 to 8 bar is fed by means of a duct A controlled by a main electrovalve B which opens when the dehumidifier is activated. A pressure reducing valve C controls the pressure of the compressed air in order to obtain a desired flow rate. Air flow rate is then divided into two parallel branches of the circuit: one branch being intercepted by a flow regulator E and the other by an electro-valve D. The main portion of the flow passes through the electro-valve D and reaches a fixed narrowing F designed to avoid an excessive flow rate. After a partial expansion the air reaches a heating chamber G in which it is heated to a desired temperature and then fed through a diffuser cone I located in a lower zone of a hopper H in which the granular material to be dehumidified is located. Hot air coming out from the diffuser cone I flows from the bottom to the top of the hopper H throughout the granulated material L located in the hopper H. A temperature sensor M at the upper part of the hopper or in the air discharge ducts detects the temperature of the air discharged from the hopper. When an air temperature is detected that is higher than a predetermined temperature value the electro-valve D is operated in order to reduce the air flow rate to the heating chamber G. In this way, once the granular material has been heated up to a predetermined temperature, only a minimum flow rate of dried air is maintained through it, so as to ensure a suitable dehumidification and temperature level throughout the dehumidification process.

Many variations exist to the above described circuit, sometimes for the same purposes some other times for improvement purposes, with different configurations of the various components but operating in the same way as the above described apparatus. More particularly, an interesting solution is disclosed in EP-0 995 959, where use is made of a unit of five electro-valves in place of the electro-valve D and the flow regulator E. Each electro-valve has a through light of different size, so that by selecting the various valves different flow rates can be obtained. A step control device is thus the circuit is thus available designed to control the flow rate as a function of the characteristic features of the material to be processed.

SUMMARY OF THE INVENTION

The main object of the present invention is to provide a compressed-air dehumidification plant for granules of plastics materials which is arranged to produce dehumidification air of higher quality than that produced by conventional dehumidification plants, even if provided with traps or filters for disposal of the condensation.

Another object of the present invention is to provide a dehumidification plant suitable for obtaining in a simple and rapid manner an air flow rate specifically required by the type of material to be processed.

Another object of the present invention is to provide a very compact dehumidification plant that can be directly installed on the hopper designed to contain the material to be processed.

Another object of the present invention is to provide a modular compressed-air dehumidification plant which can be easily manufactured and operated at low costs.

According to a first aspect of the present invention there is provided a compressed-air dehumidification plant comprising at least one molecular sieve cartridge that can be regenerated according to a pressure drop principle.

Advantageously, a compressed air dehumidification plant according to the present invention comprises a control system including a manual valve and a flowmeter to adjust the compressed-air flow rate to a desired value.

In a compressed-air dehumidification plant according to the present invention its various components are preferably structured as modules that can be easily assembled and disassembled from one another and have very small dimensions with respect to conventional plants so that they can easily and rapidly installed and set in operation.

BRIEF DESCRIPTION OF THE DRAWINGS

Further features and advantages of the present invention will become better apparent from the following detailed description of one presently preferred embodiment thereof, given by way of non-limiting example of carrying out the invention, with reference to the accompanying drawings, in which.

DESCRIPTION OF PREFERRED EMBODIMENTS

In the accompanying drawings, the same or similar parts or components have been indicated with the same reference numerals.

With reference first to FIGS. 2 to 7 above listed, it will be seen that a compressed-air dehumidification plant according to the present invention comprises a plurality of components some of which can be grouped into very small-size modules, e. g. those indicated with 21 and 22. Compressed air, supplied by a compressed-air source (non shown in the drawings) of any suitable kind, is fed to the dehumidification plant through an inlet duct O. Compressed-air fed through duct O has preferably a pressure ranging from 6 to 10 bar and can be preferably filtered by means of a oil-separator filter 1 before being forwarded to a first control electro-valve 2 which allows compressed air to pass through it upon starting the dehumidification plant and to stop it should the electric current supply be cut off.

Figure 2:
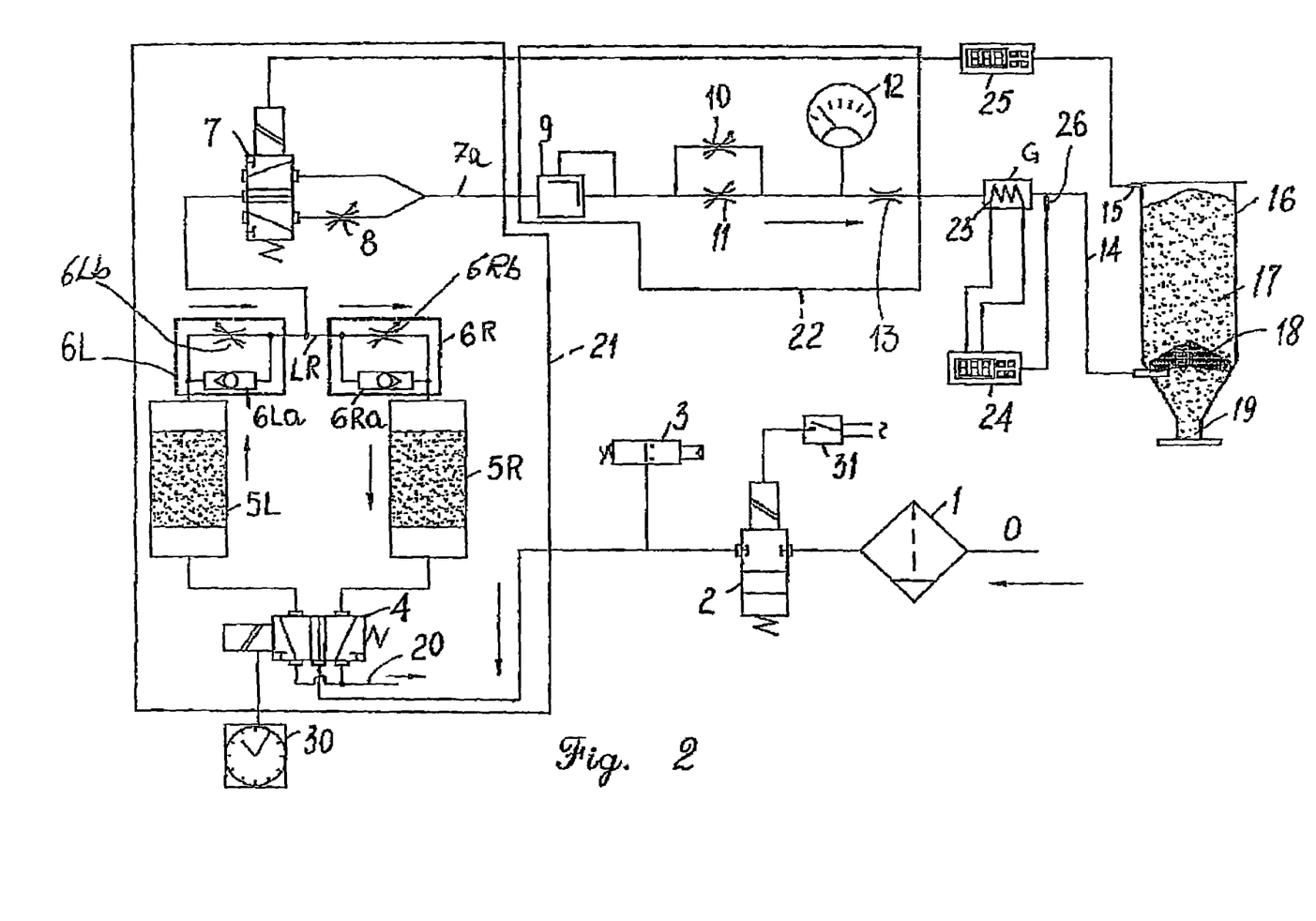
FIG. 2 is a scheme of a compressed-air dehumidification plant according to the present invention provided with a hopper for containing the material to be processed.
Figure 3:
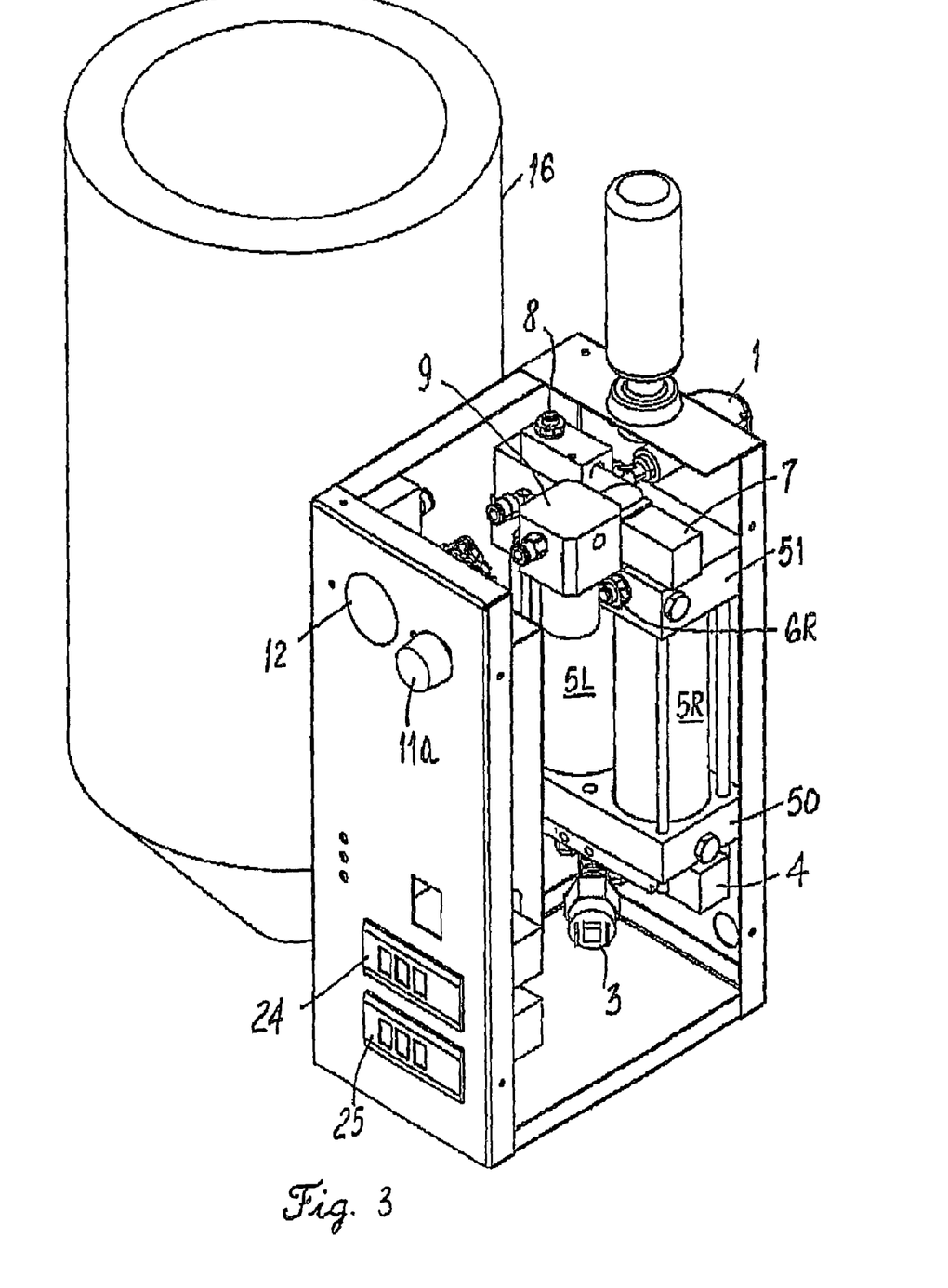
FIG. 3 is a perspective view with parts cut away of the dehumidification plant of FIG. 2.

The control electric-valve 2 is directly controlled by an on/off switch 31 of the dehumidifier so that, when the dehumidifier is on, air can flow through valve 2, whereas air flow is cut off when the dehumidifier is off.

A pressure switch 3 controls that a sufficient pressure exist in the duct O downstream of the control electro-valve 2 to avoid that, in the absence of air, a resistor or a group of resistors inside a heating chamber G is damaged. The air from control electro-valve 2 is forwarded to a distributing valve 4 arranged selectively to feed air to two molecular sieve cartridges 5L and 5R connected in parallel to one another.

FIG. 2 shows a distributing valve 4 which on the one side allows pressured air to reach cartridge 5L or 5R, and on the other puts the cartridge 5R or 5L into communication with the atmosphere through a discharge duct 20.

The module 21 comprises two flow controlling units 6L, 6R each having one inlet and one outlet connected in parallel to a respective check valve 6La, 6Ra and a flow regulator 6Lb and 6Rb, respectively.

In the working condition of the module 21 of FIG. 2 air, after passing through the cartridge 5L, flows through the flow controlling unit 6L, i. e. partly through check valve 6La and partly through the flow regulator 6Lb.

The air flow downstream of the unit 6L is fed through a duct LR to a five-way and two-position electro-valve 7, and to flow controlling unit 6R. The unit 6R owing to the presence of unidirectional valve 6Ra which allows air flowing from cartridge 5R to duct LR, makes it possible for air to flow only through the flow regulator 5Rb to reach cartridge 5R, this resulting in a substantial pressure drop in the air flow to cartridge 5R. The pressure inside cartridge 5R is thus about the atmospheric pressure since cartridge 5R through the distributing valve 4 is cyclically in communication with the atmosphere.

Owing to such a pressure drop, the dew point of the air within cartridge 5R is drastically lowered, e. g. it can reach about −70° C. for an air pressure drop of about 8 bar. This means that regeneration of cartridge 5R, i. e. removal of humidity from molecular sieves therein, can occurs at quite favourable pressure and temperature conditions, since at a low dew point humidity can be easily and rapidly taken away from molecular sieves by dried air at room temperature and pressure flowing through cartridge 5R.

The distributing valve 4 is cyclically switched by a timer 30 of any suitable type, thereby changing roles, air flow and pressure in the cartridges 5L and 5R. When in one of the cartridges 5L, 5R a maximum pressure (6-10 bar) exists, humidity is adsorbed from the air passing through it, whereas when a cartridge is at atmospheric pressure it partly releases humidity adsorbed in the sieves, that become thus regenerated. This mode of operation is called "pressure switch" and its pressures, times and size change as a function of the used adsorbent agent and the air parameters.

In the present application molecular sieves of zeolite type are preferably used. The pressure drop is equal to about the operation pressure of the dehumidifier, i. e. 6-8 bar. With such work conditions the humidity release by sieves is determined by the dew point (which can be as low as to −70° C.) of the air released by the cartridge being regenerated.

The electro-valve 7, in a first or open position thereof, allows free passage of air flow, whereas when it is switched to a second or closed position air flow is forwarded to a flow regulator 8 that causes a flow rate reduction. With this arrangement two air flow rates are obtained, i. e. one when the electro-valve 7 is in its open position and the other when the same valve is in its closed position.

On a manifold duct 7a downstream of the electro-valve 7 a pressure reducing device 9 is located, which causes a first pressure drop to avoid a flow rate excess. The outlet of the pressure reducing device 9 is into fluid communication with two flow regulators 10 and 11 connected in parallel to one another. The flow regulator 10 is pre-set and adapted to ensure a minimum air flow through it, whereas the flow regulator 11 can be manually adjusted by a user, e. g. by means of a knob 11a (FIG. 3) so as to set the air flow rate through it as function of the features of the material to be dehumidified.

A flowmeter, comprising a manometer 12 and a neck portion 13, is provided to detect the air amount supplied by the flow regulators 10 and 11. The scale of manometer 12 is advantageously converted into a unit of measure for the air flow in order to be more easily readable by the user.

Air coming from the neck portion 13 is forwarded to an inlet of heating chamber G, in which use is made of an electric resistor or a group of electric resistors 23 as heat source. The temperature can be adjusted to a desired value by means of a temperature sensor 26 located at the outlet of the heating chamber G and arranged to send control signals to a first programmable thermoregulator 24.

A connecting duct 14 connects the electro-pneumatic portion of the dehumidification plant, i. e. the plant portion formed by the module 22, to a hopper 16 containing a material 17 to be dehumidified. The incoming air is distributed into the material 17 by a diffuser cone 18 located in a lower zone of the hopper, so that compressed air escaping from the diffuser cone 18 flows through the granular material from bottom towards the top. At the upper part of the hopper 16 a temperature sensor 15 detects the temperature of the air being discharged into the atmosphere through an evacuation line (not shown in the drawings) loaded with humidity. The temperature sensor 15 is electrically connected to a second thermoregulator 25 that, in turn, controls the electro-valve 7, and thus, when the granular material in the hopper 16 has reached a desired temperature, the compressed-air flow rate through the hopper 16 is reduced, thereby ensuring a low energy consumption and also preventing the granular material to be dehumidified from being subjected to excessive heating stress.

The cone diffuser 18 is preferably shaped as a star with three tips (FIGS. 6 and 7) having a raised central area and obtained from a perforated, bent and welded metal sheet. In this way the delivery duct 14, ending underneath the diffuser cone 18, supplies dried and hot air which is distributed by the diffuser cone 18 by flowing through the perforations of the metal sheet and through the peripheral gap between diffuser cone and inner wall of the hopper. The diffuser cone 18 is also arranged to control and optimize the descending flow of the granular material in the hopper.

The hopper 16 preferably has a plurality of air outlets at the top thereof, which preferably discharge into a common duct discharging air loaded with humidity into the atmosphere The above-described plant is suitable for achieving all the above mentioned objects and is susceptible to numerous modifications and variations within the scope of the present invention as defined by the claims.

Thus, for example, the module 21 can, in practice, comprise (FIGS. 4 and 5) a couple of head castings: lower one 50 and upper one 51, each of which has two receiving seats 52 and 53, preferably circular in shape. Each seat 52 and 53 is designed to receive the lower end of a respective cartridge 5L and 5R, preferably with the interposition of a perforated disc 54. The pair of heads 50, 51, the drilled discs and the cartridges 5L and 5R are, in use, kept together by any suitable means, such as a plurality (four) connecting rods, generically indicated at 55.

Figure 4:
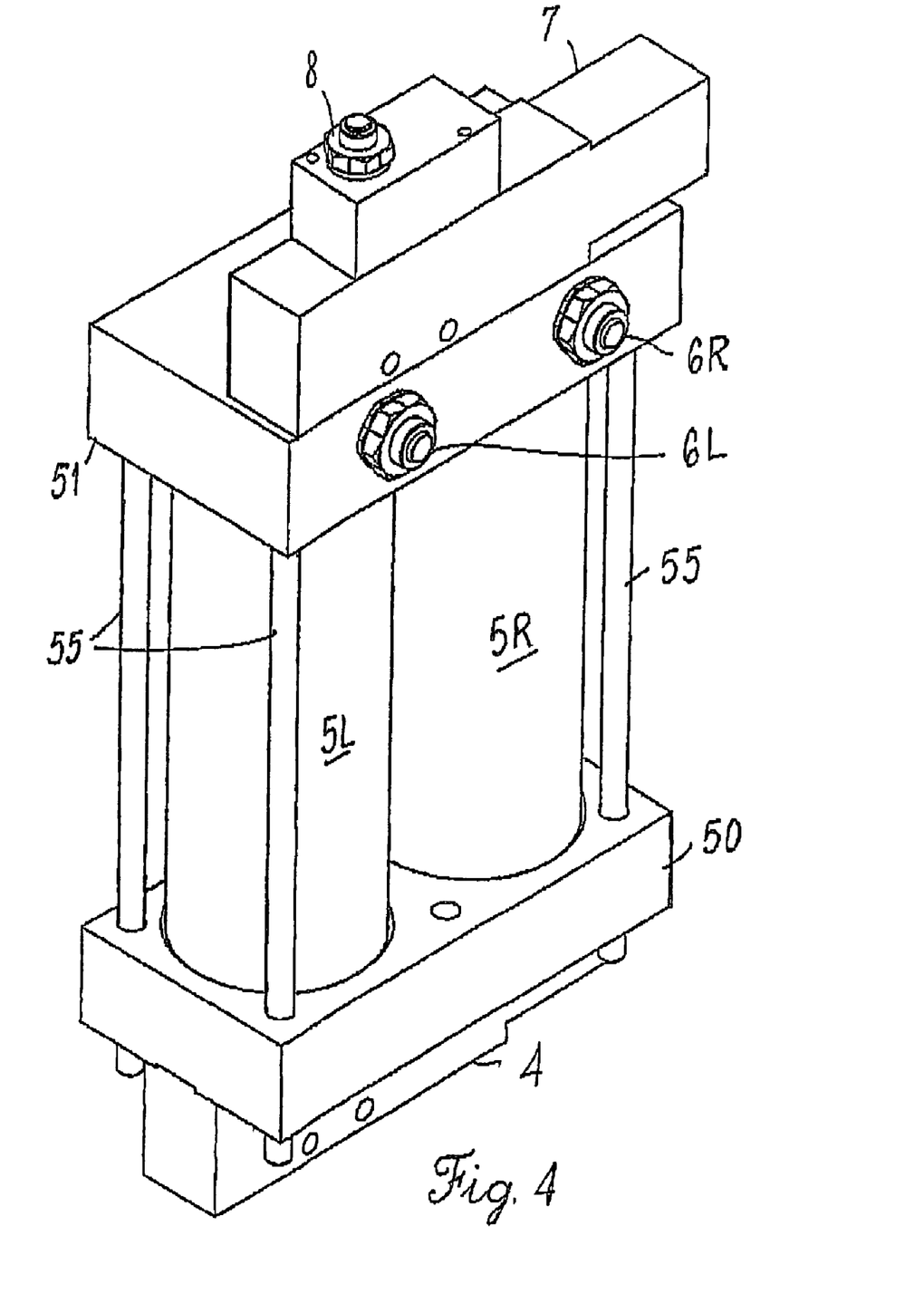
FIG. 4 is a perspective view of an integrated module comprising two molecular sieve cartridges, two electro-valves and unidirectional flow controlling valves.
Figure 5:
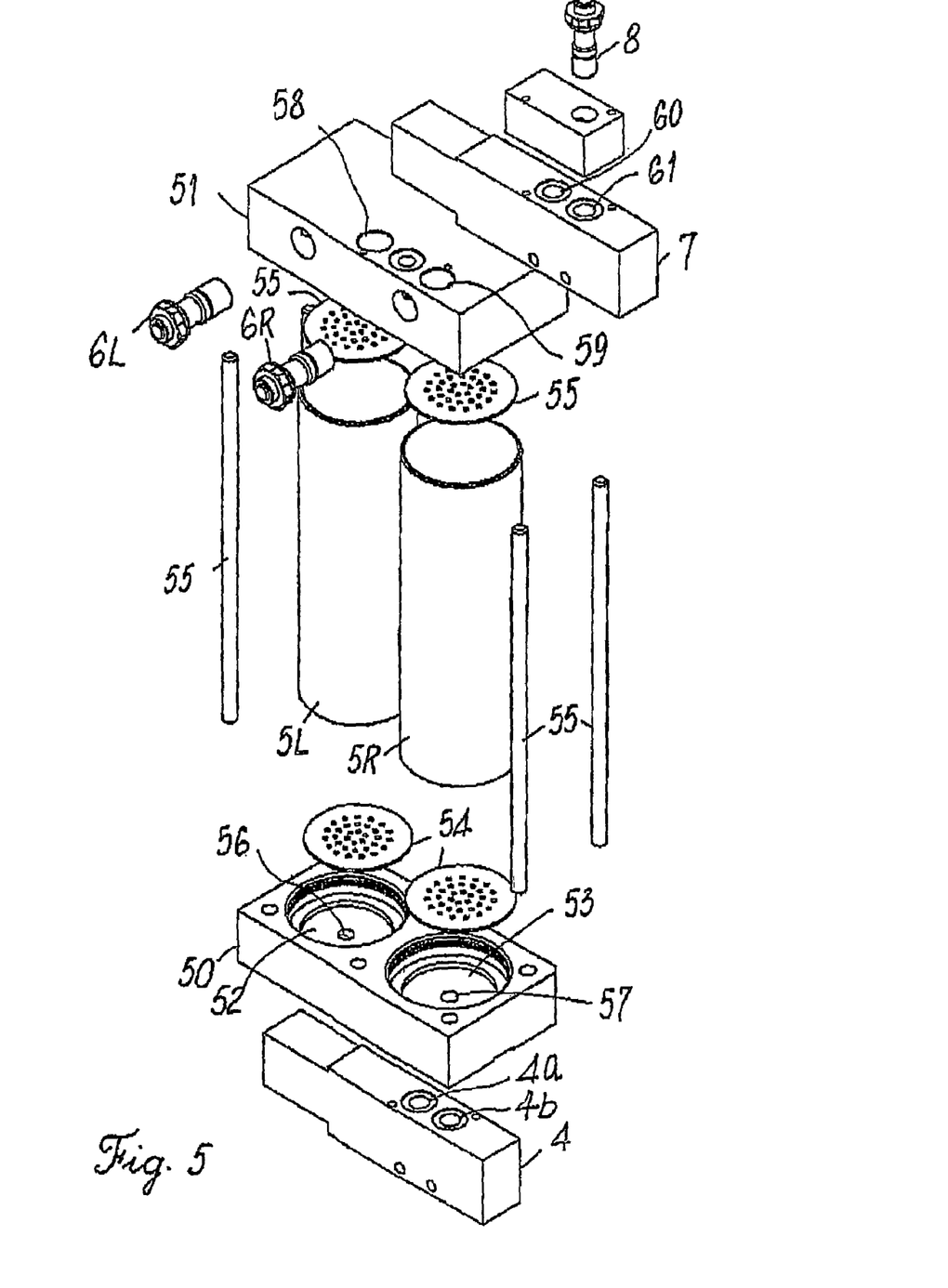
FIG. 5 is an exploded perspective view of the integrated module of FIG. 4.
Figure 6:
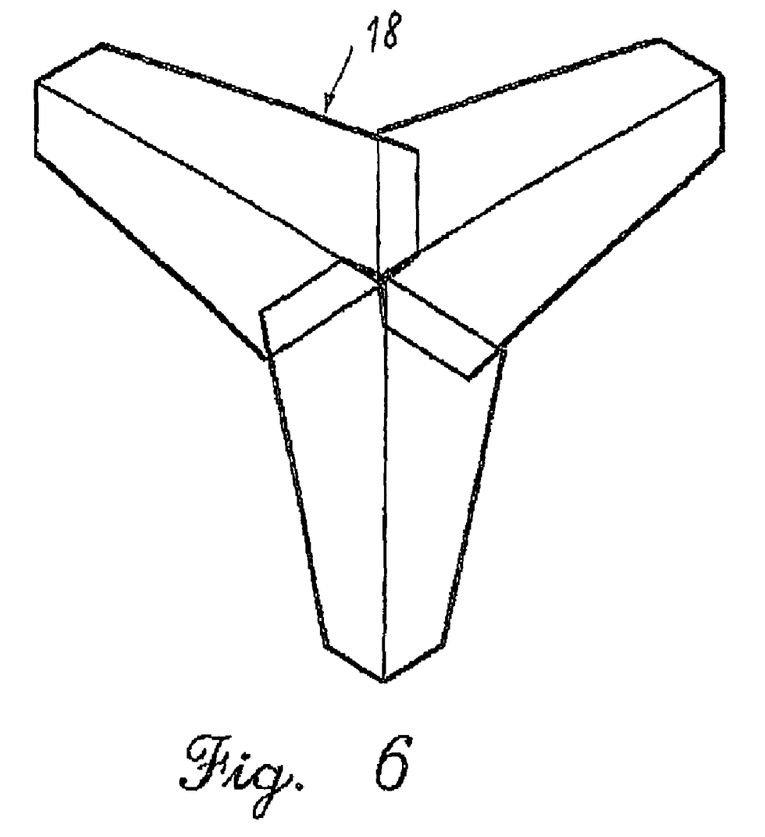
FIG. 6 is a plant view of a cone diffuser device which can be located in a granule processing hopper.
Figure 7:
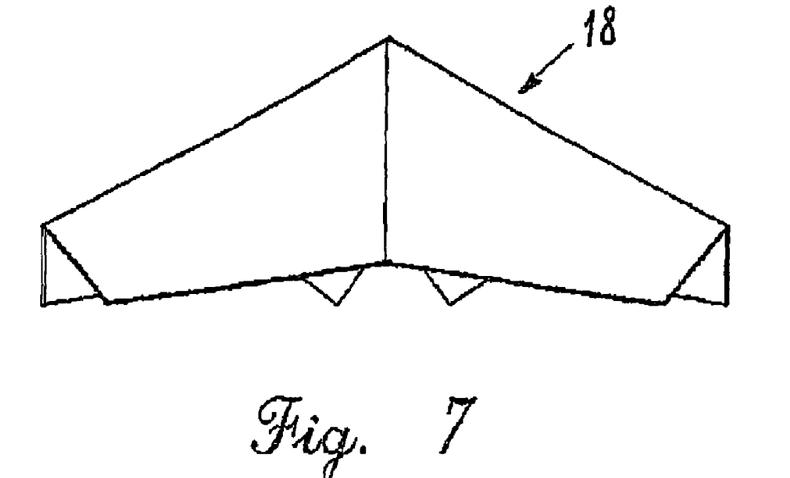
FIG. 7 is a front view of the cone diffuser device of FIG. 6.

At the lower face of the lower head 50, a lower valve group 4 with two inlet/outlet openings 4a and 4b is mounted, preferably fixed by bolts (not shown), so that the inlet/outlet openings are facing towards the lower head. The lower head 50 is provided with suitable ducts, so that the inlet/outlet opening 4a is in fluid communication with a through hole 56 formed in the bottom of the seat 52 and the inlet/outlet opening 4b is in communication with a through hole 57 formed in the bottom of the seat 53.

Similarly, the upper head 51 is coupled to the upper end of the cartridges 5L, 5R with the interposition of perforated discs 55. More particularly, a receiving seat (not shown in the drawings) in the upper end of the cartridge 5L is in fluid communication with an inner duct (also not shown in the drawings) which ends at the head top where it communicates with an outlet through opening 58 and is intercepted by the unidirectional flow regulator unit 6L, whereas a receiving seat (not shown in the drawings) of the upper end of the cartridge 5R is in fluid communication with an inner duct (also not shown in the drawings) which is connected at the top thereof with an outlet opening 59 and intercepted by the unidirectional flow regulator unit 6R.

The valve unit 7 with two outlet openings 60 and 61, one of which, e. g. the opening 61, is intercepted by the flow regulator 8, can be fixed, e. g. by means of bolts, to the head 51.

The invention claimed is:

1. A dehumidification plant for granular material which comprises
    a compressed air source,
    control means for controlling the flow rate of compressed air applied by said source,
    at least one heating chamber of compressed air which is in fluid communication with said flow rate control means,
    at least one container of granular material to be dehumidified,
    diffuser means disposed in said container for dispersing compressed and hot air through said granular material in said at least one container,
    temperature sensor means arranged to detect the temperature of air leaving said at least one container,
    at least one programmable control unit,
    at least one compressed-air dehumidifying group located downstream of said flow rate control means, and
    at least one flow rate adjusting group for the dehumidified air coming from said at least one dehumidifying group located upstream of said at least one heating chamber
    each dehumidification group comprising:
        at least one pair of molecular sieve cartridge units,
        a valve distributing means having an inlet in communication with said compressed-air flow control means, and two outlets in fluid communication with said at least one pair of sieve cartridge units and an outlet in communication with the atmosphere, and
        a pair of unidirectional flow, regulator units for at least one pair of said sieve cartridge units is provided which are in fluid communication with one another through a connection duct, each unidirectional flow regulator unit being located downstream of at least one molecular sieve cartridge unit, each flow
    regulator unit comprising respective check valves and respective flow
    regulator means connected in parallel with said check valve;
    wherein each check valve is arranged to allow air to controllably flow from a molecular sieve cartridge unit while operating as an adsorbing unit to said connection duct, whereas air flow from one sieve cartridge unit to the other can occur through said flow regulator means thereby causing an air flow pressure drop.

2. The plant as claimed in claim 1, wherein said at least one air drying sieve unit is designed to operate at an adsorbing pressure of about 6-8 bar.

3. The plant as claimed in claim 1, wherein said at least one dehumidification group is regenerable at a relatively low pressure and at a relatively high temperature.

4. The plant as claimed in claim 3, wherein said relatively high temperature in said at least one sieve regeneration cartridge unit is about of 100° C. above the dew point of the regenerated air flowing there-through.

5. The plant as claimed in claim 1, wherein each dehumidifying group comprises an upper and a lower head casting, each having two receiving seat designed to receive one end of a respective sieve cartridge unit.

6. The plant as claimed in claim 5, wherein each flow regulator unit is located in said upper head casting.

7. The plant as claimed in claim 1, wherein each flow rate adjusting group comprises, in sequence, reducing pressure means , a pair of air flow regulators connected in parallel downstream of said reducing pressure means, said flow regulator being set by a predetermined air flow value, whereas said flow regulator is adjustable, and flowmeter means are arranged to measure the air flow rate from said flow regulators.

8. The plant as claimed in claim 7, wherein said flowmeter means comprises a manometer and a neck portion.

9. The plant as claimed in claim 1, comprising at least one temperature sensor means disposed downstream of said at least one heating chamber and a first thermoregulator means controllable by said temperature sensor means to adjust the temperature in each heating chamber as a function of both the flow rate of the air to be heated and the temperature of the material to be dehumidified.

10. The plant as claimed in claim 1, wherein the diffuser means comprises a diffuser cone means located inside each container and made of a perforated star-shaped metal sheet with a raised central portion.

11. A dehumidification plant for granular material which comprises a
- compressed air source,
- control means for controlling the flow rate of compressed air applied by said source,
- at least one heating chamber of compressed air which is in fluid communication with said flow rate control means,
- at least one container of granular material to be dehumidified,
- diffuser means disposed in said container for dispersing compressed and hot air through said granular material in said at least one container,
- temperature sensor means arranged to detect the temperature of air leaving said at least one container,
- at least one programmable control unit,
- at least one compressed-air dehumidifying group located downstream of said flow rate control means, and
- at least one flow rate adjusting group for the dehumidified air coming from said at least one dehumidifying group located upstream of said at least one heating chamber, wherein each dehumidifying group comprises:
- at least one pair of sieve cartridge units;
- a pair of unidirectional flow regulator units for said at least one pair of said sieve cartridge units, which are in fluid communication with one another through a connection duct, each unidirectional flow regulator unit being located downstream of one respective sieve cartridge unit;
- an electro-valve means having an inlet in fluid communication with said connecting duct and at least two outlets in fluid communication with a manifold duct, at least one outlet of said valve means being provided with a flow regulator means;

and wherein each flow rate adjusting group comprises in sequence:
- a pressure reducing device located downstream of said electro-valve;
- at least one flow regulator in fluid communication with the outlet of said pressure reducing device;
- at least one flowmeter, provided to detect the air amount supplied by said at least one flow regulator.

12. A plant as claim in claim 11, wherein said flowmeter means comprises a manometer and a neck portion.

13. A plant as claimed in claim 11, comprising at least one temperature sensor means disposed downstream of said at least one heating chamber and first thermoregulator means controllable by said temperature sensor means to adjust the temperature in each heating chamber as a function of both the flow rate of the air to be heated and the temperature of the material to be dehumidified.

14. A plant as claimed in claim 11, comprising a second thermoregulator means controllable by said temperature sensor means and arranged to control said electro-valve means.

15. A plant as claimed in claim 11, characterized in that said at least one dehumidifying group (21) is of adsorption type with inside regeneration system.

16. A plant as claimed in claim 11, characterized in that said dehumidifying group is regenerable through a pressure drop at an adsorption pressure higher than desorption or regeneration pressure.

* * * * *